United States Patent
Thomas (10) Patent No.: US 9,058,381 B2
(45) Date of Patent: Jun. 16, 2015

(54) METHOD OF AND APPARATUS FOR IDENTIFYING MACHINE-GENERATED TEXTUAL IDENTIFIERS

(75) Inventor: Matthew Thomas, Lausanne (CH)

(73) Assignee: VERISIGN, INC., Reston, VA (US)

( * ) Notice: Subject to any disclaimer, the term of this patent is extended or adjusted under 35 U.S.C. 154(b) by 211 days.

(21) Appl. No.: 12/859,820

(22) Filed: Aug. 20, 2010

(65) Prior Publication Data

US 2012/0047153 A1 Feb. 23, 2012

(51) Int. Cl.
*G06F 7/00* (2006.01)
*G06F 17/30* (2006.01)
*H04L 29/06* (2006.01)

(52) U.S. Cl.
CPC .... *G06F 17/30707* (2013.01); *G06F 17/30943* (2013.01); *G06F 17/30861* (2013.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 6,016,512 | A * | 1/2000 | Huitema | 709/245 |
| 7,136,932 | B1 * | 11/2006 | Schneider | 709/245 |
| 8,260,914 | B1 * | 9/2012 | Ranjan | 709/224 |
| 2008/0005127 | A1 * | 1/2008 | Schneider | 707/10 |
| 2009/0013089 | A1 * | 1/2009 | Sullivan et al. | 709/238 |
| 2009/0157675 | A1 | 6/2009 | Stellhorn et al. | |
| 2010/0037314 | A1 | 2/2010 | Perdisci et al. | |
| 2010/0095377 | A1 | 4/2010 | Krywaniuk | |
| 2010/0100957 | A1 * | 4/2010 | Graham et al. | 726/22 |
| 2010/0325250 | A1 * | 12/2010 | Colosi | 709/221 |

OTHER PUBLICATIONS

Zhu et al., "Using Failure Information Analysis to Detect Enterprise Zombies", SecureComm 20909, LNICST 19, pp. 185-206, 2009.*
Tan et al., "Discovery of Web Robot Sessions Based on Their Navigational Patterns", Intelligent Technologies for Information Analysis, pp. 193-222, Springer-Verlag Berlin Heidelberg, 2004.*
Marko et al., "Efficient Detection of Malicious Nodes Based on DNS and Statistical Methods", 10th IEEE Jubilee International Symposium on Applied Machine Intelligence and Informatics, pp. 227-230, 2011, IEEE.*
Yadav et al., "Detecting Algorithmically Generated Malicious Domain Names", IMC '10, pp. 48-61, ACM, Nov. 2010.*
International Search Report and Written Opinion mailed Dec. 22, 2011 for Application No. PCT/US2011/47201, 6 pages.

* cited by examiner

*Primary Examiner* — Michael Hicks
(74) *Attorney, Agent, or Firm* — MH2 Technology Law Group, LLP (57) ABSTRACT

Methods and systems provide tracking or logging requests to resolve non-existent textual identifiers and classifying the textual identifier into a predefined set of taxonomical categories to support the detection of machine generated textual identifiers. Detection includes calculating a measure of probability based on the analysis and classification of prior textual identifier requests from a set of requests for a specific textual identifier.

13 Claims, 9 Drawing Sheets

$$P(A|B) = \frac{P(B|A)P(A)}{P(B)}$$

Where 'A' represents a machine generated Textual Identifier and 'B' represents an classified Textual Identifier Requestor.

•NXDomain →
List<IPAddresses>
•IP → List<Taxonomy Sets w/ Counts>
•IP → List<Machine, Non-Machine...>
•P(Machine Gen Textual Identifier | Requestor) = (1 – P( Requestor | Machine Gen Text Identity))

•Frequency with which the IP addresses that have requested a given domain request "real" or "non-machine generated" domains....
•Formula:

$$\sum_{i=1}^{k} ( (\#_i) / k ) * P(\text{Machine Gen} | IP_i )$$

```
10-20-2009:22.01.21:tko2:113.142.10.14:pozyq.com.:A
10-20-2009:22.05.33:tko2:216.240.130.59:kalpakianmd.com.:A
10-20-2009:22.13.12:tko2:216.240.130.59:kalpana-asok.com.:A
10-20-2009:22.42.03:tko2:83.49.126.188:ifecltko.net.:A
10-20-2009:22.55.25:tko2:113.142.10.13:fpuvet.com.:A
10-20-2009:22.56.13:tko2:202.96.136.231:younyshiny.com.:A
10-20-2009:22.57.04:tko2:113.142.10.14:qdping.com.:A
10-20-2009:22.58.07:tko2:66.133.150.37:jrrination.com.:A
10-20-2009:22.13.02:tko2:60.254.209.155:kaicn.com.:A
10-20-2009:22.25.05:tko2:116.113.84.26:wzqejb.com.:A
10-20-2009:22.26.43:tko2:60.215.138.62:china-longyang.com.:A
10-20-2009:22.26.23:tko2:113.142.10.13:gdopus.com.:A
10-20-2009:22.34.16:tko2:113.142.10.14:qdqtl.com.:A
10-20-2009:22.43.13:tko2:113.142.10.14:qdprt.com.:A
```

METHOD OF AND APPARATUS FOR IDENTIFYING MACHINE-GENERATED TEXTUAL IDENTIFIERS

CROSS-REFERENCE TO RELATED APPLICATIONS

This application is related to U.S. patent application Ser. No. 12/763,349 filed Apr. 20, 2010 and entitled "System for and Method of Identifying Closely Matching Textual Identifiers, Such as Domain Names" and to U.S. patent application Ser. No. 12/859,810 filed Aug. 20, 2010 and entitled "Method of and Apparatus for Identifying Requestors of Machine-Generated Requests to Resolve a Textual Identifier," both of which are incorporated herein in their entireties by reference.

TECHNICAL FIELD

The following disclosure relates generally to identifying machine generated textual identifiers and more particularly to the identification of textual identifiers from machine generating sources of textual identifiers such as unresolvable, non-registered, and/or non-existent domains.

BACKGROUND

The Internet enables a user of a client computer system to identify and communicate with millions of other computer systems located around the world. A client computer system can identify each of these other computer systems using a unique numeric identifier for that computer called an "IP address." When a communication is sent from a client computer system to a destination computer system, the client computer system typically specifies the IP address of the destination computer system in order to facilitate the routing of the communication to the destination computer system. For example, when a request for a World Wide Web page ("Web page") is sent from a client computer system to a Web server computer system ("Web server") from which that Web page can be obtained, the client computer system typically includes the IP address of the Web server.

In order to make the identification of destination computer systems more mnemonic, a Domain Name System (DNS) has been developed that translates a unique alphanumeric name for a destination computer system into the IP address for that computer. The alphanumeric name is called a "domain name." For example, referring to FIG. 10, the domain name for a hypothetical computer system operated by IBM Corporation may be "comp23.IBM.com". Using domain names, a user attempting to communicate with this computer system could specify a destination of "comp23.IBM.com" rather than the particular IP address of the computer system (e.g., 198.81.209.25).

A user can also request a particular resource (e.g., a Web page or a file) that is available from a server computer by specifying a unique Universal Resource Indicator ("URI"), such as a Uniform Resource Locator ("URL"), for that resource. A URL includes a protocol to be used in accessing the resource (e.g., "http:" for the HyperText Transfer Protocol ("HTTP")), the domain name or IP address of the server that provides the resource (e.g., "comp23.IBM.com"), and optionally a path to the resource (e.g., "/help/HelpPage.html"). Thus "http://comp23.IBM.com/help/HelpPage.html" is one example of a URL. In response to a user specifying such a URL, the comp23.IBM.com server would typically return a copy of the "HelpPage.html" file to the user.

In addition to making the identification of destination computer systems more mnemonic, domain names introduce a useful layer of indirection between the name used to identify a destination computer system and the IP address of that computer system. Using this layer of indirection, the operator of a particular computer system can initially associate a particular domain name with a first computer system by specifying that the domain name corresponds to the IP address of the first computer system. At a later time (e.g., if the first computer system breaks or must be replaced), its operator can "transfer" the domain name to a second computer system by then specifying that the domain name corresponds to the IP address of the second computer system.

The domain names in DNS are structured in a hierarchical, distributed database that facilitates grouping related domain names and computers and ensuring the uniqueness of different domain names. In particular, as mentioned above, a particular domain name such as "IBM.com" may identify a specific host computer. However, the hierarchical nature of DNS also allows a domain name such as "IBM.com" to represent a domain including multiple other domain names each identifying computers (also referred to as "hosts"), either in addition to or instead of identifying a specific computer.

Figure 10:
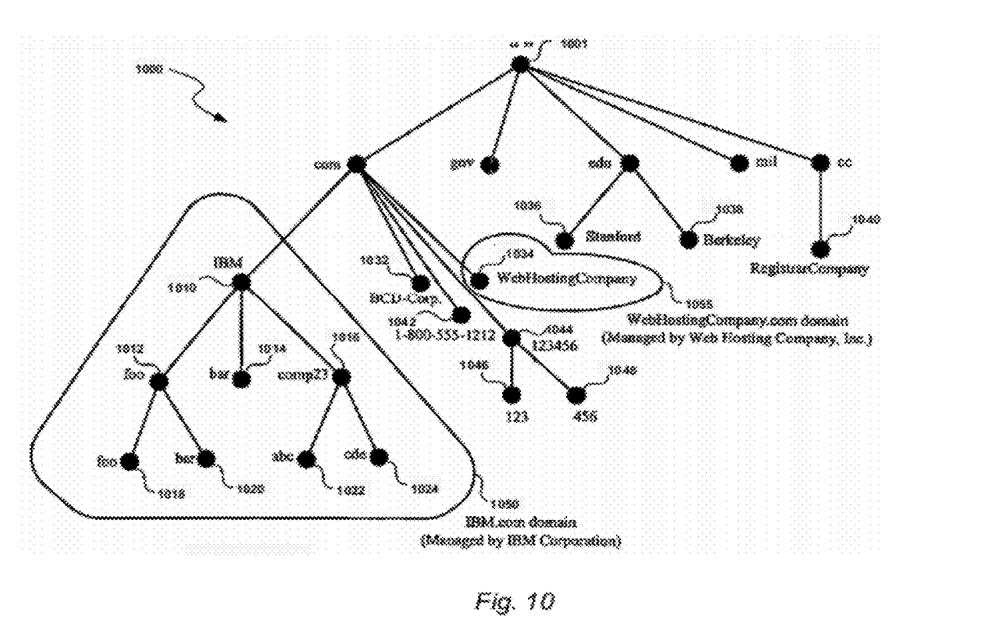
FIG. 10 is a network diagram illustrating interconnected network devices and Domain Name System (DNS) information.

FIG. 10 illustrates a hypothetical portion of the DNS database 1000 in which the node representing the IBM.com domain name 1010 is the root node in an IBM.com domain 1050 that includes 7 other nodes each representing other domain names. Each of these domain names in the IBM.com domain can be, but do not have to be, under the control of a single entity (e.g., IBM Corporation). FIG. 10 also includes a WebHostingCompany.com domain 1055 that includes a single domain name.

Figure 9:
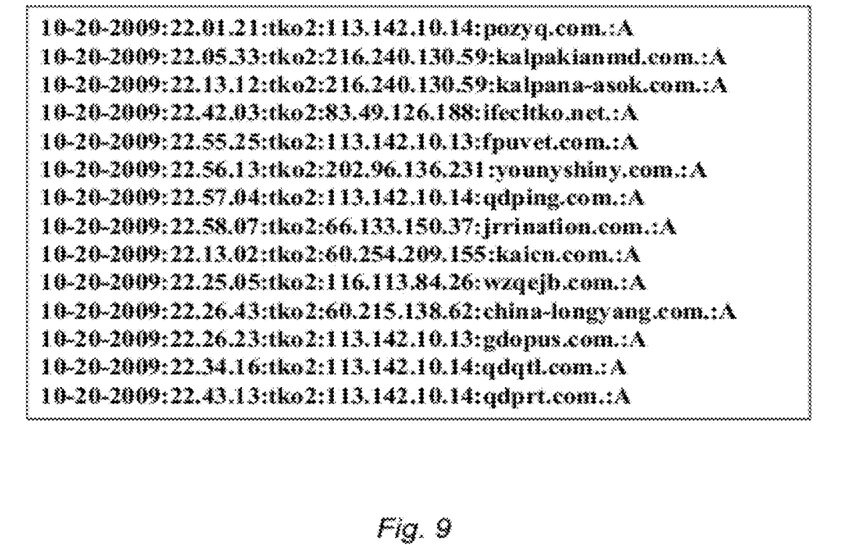
FIG. 9 is an example of raw NXDomain log data collected from authoritative root DNS servers.

As illustrated, the DNS database can be represented with a hierarchical tree structure, and the full domain name for a given node in the tree can be determined by concatenating the name of each node along the path from the given node to the root node 1001, with the names separated by periods. Thus, the 8 nodes in the IBM.com domain represent the domain names IBM.com 1010, foo.IBM.com 1012, foo.foo.IBM.com 1018, bar.foo.IBM.com 1020, bar.IBM.com 1014, comp23.IBM.com 1016, abc.comp23.IBM.com 1022, and cde.comp23.IBM.com 1024. Other ".com" domain names outside the IBM.com domain are also illustrated in FIG. 9, including the second-level domain names BCD-Corp.com 1032, WebHostingCompany.com 1034, 1-800-555-1212.com 1042 and 123456.com 1044, and the lower-level domain names 123.123456.com 1046 and 456.123456.com 1048. In addition to the ".com" top-level domain ("TLD"), other TLDs are also illustrated including the ".cc" geographical TLD and the ".gov", ".edu" and ".mil" organizational TLDs. Illustrated domain names under these other TLDs include Stanford.edu 1036, Berkeley.edu 1038, and RegistrarCompany.cc 1040.

New domain names can be defined (or "registered") by various domain name registrars. In particular, a company that serves as a registrar for a TLD can assist customers in registering new domain names for that TLD and can perform the necessary actions so that the technical DNS information for those domain names is stored in a manner accessible to name servers for that TLD. Registrars often maintain a second-level domain name within the TLD (e.g., a hypothetical Registrar Company that acts as a registrar for the ".cc" TLD could maintain the RegistrarCompany.cc domain name 1140), and provide an interactive Website at their domain name from which customers can register new domain names. A registrar will typically charge a customer a fee for registering a new domain name.

For the ".com", ".net" and ".org" TLDs, a large number of registrars currently exist, and a single shared registry ("the Registry") under the control of a third-party administrator stores information identifying the authoritative name servers for the second-level domain names in those TLDs. Other TLDs may have only a single registrar, and if so that registrar could maintain a registry for all the second-level domains in that TLD by merely storing the appropriate DNS information for each domain name that the registrar registers. In other situations, multiple registrars may exist for a TLD, but one of the registrars may serve as a primary registrar that maintains a registry for each of the second-level domains in that TLD— if so, the secondary or affiliate registrars for that TLD supplies the appropriate DNS information for the domain names that they register to the primary registrar. Thus, the manner in which the DNS information for a TLD is obtained and stored is affected by the registrars for that TLD.

Currently, there are a limited number of TLDs, and many available domain names in the most popular TLDs (e.g., ".com") have already been taken. Thus, users will often have difficulty identifying available or non-registered domain names, i.e., domains that therefore do not exist in the authoritative registry for the TLD, that are "non-existent domains" also termed NXDomains or NXDs. A user may, instead, often attempt to register domain names that are already registered. In such a situation, the user will be prevented from registering the domain name, but may receive little or no assistance in determining other domain names that are available. However, utilizing concepts and techniques described in applicant's copending U.S. patent application Ser. No. 12/763,349 filed Apr. 20, 2010, incorporated herein by reference in its entirety, capabilities are provided to track and organize NXDomains to support searching of the domain names to minimize or eliminate the burden of searching for an available domain name.

Because domain name resolution provided by DNS is essential to operation of the Internet and email, continual availability, operation and functioning of the system is critical. Unfortunately, not all network traffics are legitimate and, as a matter of fact, a lot of malicious traffic is passed through the Internet all the time. Such malicious DNS traffic can lead to various crimes and possibly exhaust a considerable amount of network bandwidth and resources. Therefore consideration must be given to possible scenarios that might impair DNS. Threats to the operation of the network may come in several forms including Internet bots as disclosed in U.S. Patent Publication No. US 2008/0025328 of Alberts ("Alberts"), the disclosure of which is incorporated herein by reference in its entirety. Alberts discloses enabling an end-user using an IP based network to on-line select and communicate with another end-user without revealing their identity. The selection of an end-user is performed by an Internet bot that is capable of accessing a profile list such that, during a phase in which information is transferred between both end-user, the identity of at least one end-user is not known to the other end-user because information is first transferred to the Internet bot and then from the Internet bot to the other end-user. Another scenario is described in U.S. Patent Publication No. US 2008/0155694 of Kwon et al. ("Kwon"), the disclosure of which is also incorporated herein by reference in its entirety. Kwon discloses a method for dealing with attacks of malicious BOTs, software for performing or controlling a predetermined operation by a specific event or a specific command as a script code having various functions including a remote function for specific objects. When a malicious BOT attacks a specific network or system, it generates more data than the capacity of the target network or system so as to disable the normal service. Kwon discloses addressing malicious BOTs by detecting and analyzing a domain name receiving excessive DNS queries to judge the infection of a malicious BOT, registering the corresponding domain name as normal or abnormal management target, and redirecting an abnormal DNS query for the abnormal management target to a redirection processing and response system.

Notwithstanding the benefits of DNS, the system is commonly utilized as a mechanism for other purposes such as Internet bots. These Internet bots consist of software applications that perform repetitive and automated tasks in the Internet that would otherwise be unfeasible for a human to do. Internet bots who utilize the DNS system inherently pollute legitimate human generated DNS traffic with machine generated requests. These requests, if unfiltered, will affect and skew systems designed to search NXDomains. By identifying and removing machine generated textual identifiers, systems utilizing the domain search mechanism can perform more effectively.

Additionally, the detection of machine generated textual identifiers can aid in the discovery and mitigation of malicious programs such as computer viruses. Viruses such as Conficker, also known as Downup, Downandup and Kido, have exploited the DNS system to be used as a mechanism to control infected computers. The virus would generate a list of random domain names and then attempt to connect to each of the domain names and delivery its payload message. The identification of these randomly generated domain names will help identify sources that are infected with some form of a machine generating textual identifier requesting agent. See, e.g., U.S. Patent Application Publication No. US 2009/0083411 of Takano et al.

SUMMARY

Embodiments of various aspect of the present invention include methods, software and apparatus for tracking or logging requests to resolve non-existent domain (NXDomains) and classifying the NXDomains to support a mapping of the domain requestors to a taxonomical set of frequency counts.

According to an aspect of the invention, a method of identifying machine-generated requests to resolve a textual identifier includes maintaining a log of requests made by requestors to resolve unresolvable textual identifiers; identifying from among the unresolvable textual identifiers a unique set of unresolvable textual identifiers for a given time period; storing a unique list of domains textual identifiers with their corresponding frequency of requests over the time period; and classifying the unresolvable textual identifiers within the unique set of unresolvable textual identifiers into predefined taxonomical sets including at least one taxonomical set of machine-generated textual identifiers.

According to another feature of the invention, also included are maintaining a mapping of (i) corresponding requestors to (ii) frequency counts of unresolvable textual identifiers within each of the taxonomical sets; and identifying requestors of sources of machine generated requests to resolve textual identifiers as described above; identifying log records of requests made for unresolvable textual identifiers within the one taxonomical set of machine-generated textual identifiers as suspicious requests; and creating a set of candidate textual identifiers by filtering the suspicious requests by a set of statistical heuristics.

According to another feature of the invention, the requestors are name servers and the textual identifiers are domain names.

According to another feature of the invention, the machine generated requests are generated by an Internet bot.

According to another feature of the invention, the Internet bot may be a internet agent, a search engine spider, a spider-bot, a robot, virus malware, a crawler, an ant or an automatic indexer.

According to another feature of the invention, the unresolvable textual identifiers are nonregistered or non-existent domain names (NXDomains).

According to another feature of the invention, the log of requests includes an NXDomain data store.

According to another feature of the invention, the taxonomical sets include a set of unresolveable textual identifiers exhibiting a characteristic of existing registered textual identifiers.

According to another feature of the invention, the characteristic of existing registered textual identifiers may be a word; a prefix string (e.g., "www" and "ftp"); a character string length less than a threshold number of characters; a variation of a registered textual identifier representing a typographical or spelling error; a soundex equivalent of a registered textual identifier; a keyboard-equivalent entry of a registered textual identifier; or a edit distance from a registered textual identifier that is less than a threshold value.

According to another feature of the invention, the taxonomical sets include a set of unresolveable textual identifiers exhibiting a characteristic of existing registered domain names.

According to another feature of the invention, the characteristic of existing registered domain names may a word; a subdomain prefix string (e.g., "www" and "ftp"); a character string length less than a threshold number of characters; a variation of a registered domain name representing a typographical or spelling error; a soundex equivalent of a registered domain name; a keyboard-equivalent entry of a registered domain name; or a edit distance from a registered domain name that is less than a threshold value.

According to another feature of the invention, the taxonomical sets include a set of unresolvable textual identifiers exhibiting a characteristic of nonregistered textual identifiers.

According to another feature of the invention, the taxonomical sets include a set of unresolvable textual identifiers exhibiting a characteristic of non-existent domain s(NXDomains).

According to another feature of the invention, the taxonomical sets are partitioned into (i) Internet bot generated textual identifiers and (ii) non-Internet bot generated textual identifiers.

According to another feature of the invention a threshold amount of Internet bot generated textual identifiers relative to non-Internet bot generated textual identifiers may be identified.

According to another feature of the invention, also include may be identifying most requested non-registered textual identifiers from the set of candidate textual identifiers; and suggesting for registration the most requested non-registered identifiers.

According to another feature of the invention the non-registered textual identifiers within the set of candidate textual identifiers are weighted based on numbers of requests and assigning corresponding registration fees.

According to another aspect of the invention, an apparatus for identifying machine-generated requests to resolve a textual identifier includes a memory storing a log of requests made by requestors to resolve unresolvable textual identifiers; and a processor configured to identify from among the unresolvable textual identifiers a unique set of unresolvable textual identifiers for a given time period; storing a unique list of domains with their corresponding frequency of requests over the time period; and classify the unresolvable textual identifiers within the unique set of unresolvable textual identifiers into predefined taxonomical sets including at least one taxonomical set of machine-generated textual identifiers.

According to another feature of the invention, the processor is further configured to maintain a mapping of (i) corresponding requestors to (ii) frequency counts of unresolvable textual identifiers within each of the taxonomical sets; and identify requestors of sources of machine generated requests to resolve textual identifiers as described above; identify log records of requests made for unresolvable textual identifiers within the one taxonomical set of machine-generated textual identifiers as suspicious requests; and create a set of candidate textual identifiers by ignoring the suspicious requests.

DETAILED DESCRIPTION

The following detailed description of the invention refers to the accompanying drawings. While the description includes exemplary embodiments, other embodiments are possible and changes may be made to the embodiments described without departing from the spirit and scope of the invention. The following detailed description does not limit the invention. Instead, the appended claims and their equivalents define the scope of the invention.

Described herein are some embodiments of apparatus, methods and software systems for detecting machine generated textual identifiers. In particular, embodiments of the invention are applicable to classifying logged data in accordance with some set of classification rules defined a priori and support heuristic and statistical measurements of the classified textual identifiers and to identify machine generated textual identifiers. Thus, for illustrative purposes, some embodiments of a software facility are described below in which domain names are retrieved and classified within the NXDomain dataset. More details of embodiments of methods, apparatus and software for identifying requestors of machine generated requests to resolve textual identifiers are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein. It will be understood that the invention may be implemented using specialized instructions and/or hardware incorporated into a general purpose computer, which may convert the general purpose computer into a specific device configured according to the invention.

While various method and techniques have been described and used to detect and mitigate attacks on the DNS system, there is a continuing need to identify malicious traffic toward mitigating and otherwise processing this traffic to minimize and/or avoid undesirable effects.

Embodiments of the invention include a system, computer implemented method and software facility that provides a means of identifying machine generated requests to resolve textual identifiers. In particular, embodiments of the invention are applicable to classify logged data in accordance with some set of classification rules defined a priori and support heuristic and statistical measurements of the requestors of classified textual identifiers to identify machine generated requests to resolve textual identifiers. Thus, for illustrative purposes, some embodiments of a software facility are described below in which domain names are retrieved and classified within the NXDomain dataset. However, those skilled in the art will appreciate that the techniques of the invention can be used in a wide variety of other situations, including any situation in which a textual identifier may exhibit machine generated characteristics and can be identified through the use of the aforementioned classification of textual identifiers and scoring. Other embodiments of the invention may be used to combat "war dialers", the latter described in U.S. Pat. No. 7,035,387 of Russell et al., the disclosure of which is incorporated herein by reference in its entirety.

As used herein an "unregistered" textual identifier is one that has not been recorded in a centralized or authoritative identifier store. For example, a domain name that has not yet been registered, or for which the registration has lapsed in a DNS database, may be referred to as an "unregistered" domain name. Similarly, a textual identifier that has been so registered is referred to herein as a "registered" textual identifier. An "unregistered" identifier may be one that has never been registered, or it may be one for which the registration has lapsed or expired. For example, an "unregistered" domain name may be one that has never been registered in the DNS, or it may be one that was previously registered but for which the registration was allowed to lapse. As used herein, an "unresolvable" textual identifier is one that may or may not have been recorded in an identifier store, but for which a lookup on the central store fails. For example, each "unregistered" identifier is also "unresolvable," because a request to resolve such an identifier will fail. As another example, a registered identifier may be "unresolvable" due to a misconfiguration of the requestor, or a network problem between the requestor and the central identifier store. A request for an unregistered or otherwise unresolvable textual identifier may be answered by an indication that the identifier is unresolvable and/or unregistered. For example, a "non-existent-domain" or "NXDomain" (NXD) response may be returned by a DNS server in response to a request for a domain name that has not been registered in the DNS.

Figure 1:
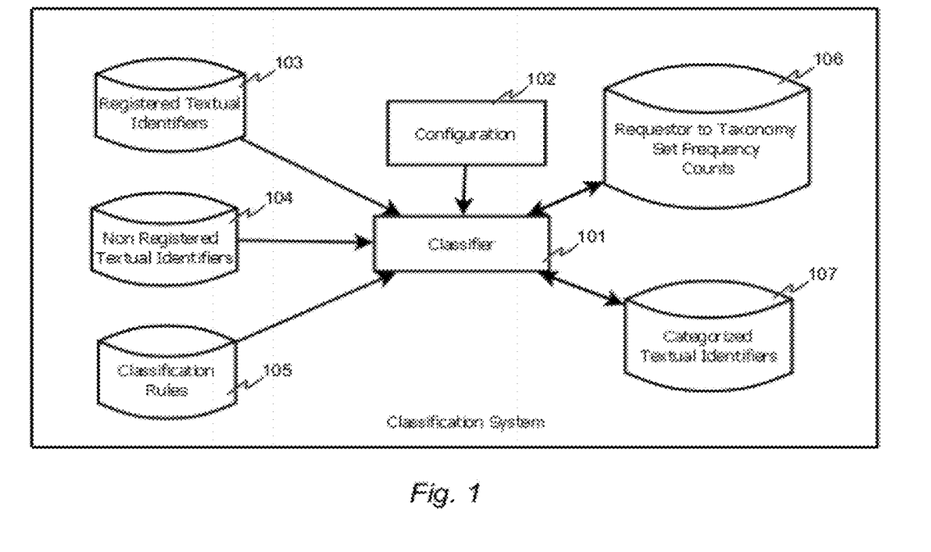
FIG. 1 is a high level component diagram of a Textual Identifier Classification System.

FIG. 1 is a high level overview of an exemplary textual identifier classification system. System 101 may include a configuration component 102 which may have, but is not limited to, a set of properties to define internal classification heuristics to be applied to one or more textual identifiers during the classification process. In the example of classifying textual identifiers such as domain names, these configuration settings may include settings such as upper and lower limits for domain lengths, edit distance limitations, etc. Classification system 101 utilizes an external repository 103 which includes a set of existing registered textual identifiers, such as registered domain names. The classification system 101 also retrieves a set of classification rules from an external repository of classification rules 105. As an input to the classification system 101, a repository of requests to resolve non-resolvable textual identifiers 104 may include historical requests to resolve a plurality of non-resolvable textual identifiers to a plurality of requestors.

After the initial configuration of the classification system 101 by the configuration 102, the classification rule repository 105 and registered textual identifier repository 103 are loaded into memory. Thereafter, records from the unresolvable textual identifier repository 104 are sequentially retrieved and processed within the classification system 101. Resulting output records are updated or inserted in two external repositories, namely a requestor-to-taxonomy-set count repository 106 and a categorized textual identifier repository 107. For example, the repository 106 may store records indicating the number of times various requestors request identifiers within various taxonomy sets, and/or the frequency with which requestors request identifiers within the taxonomy sets.

Figure 2:
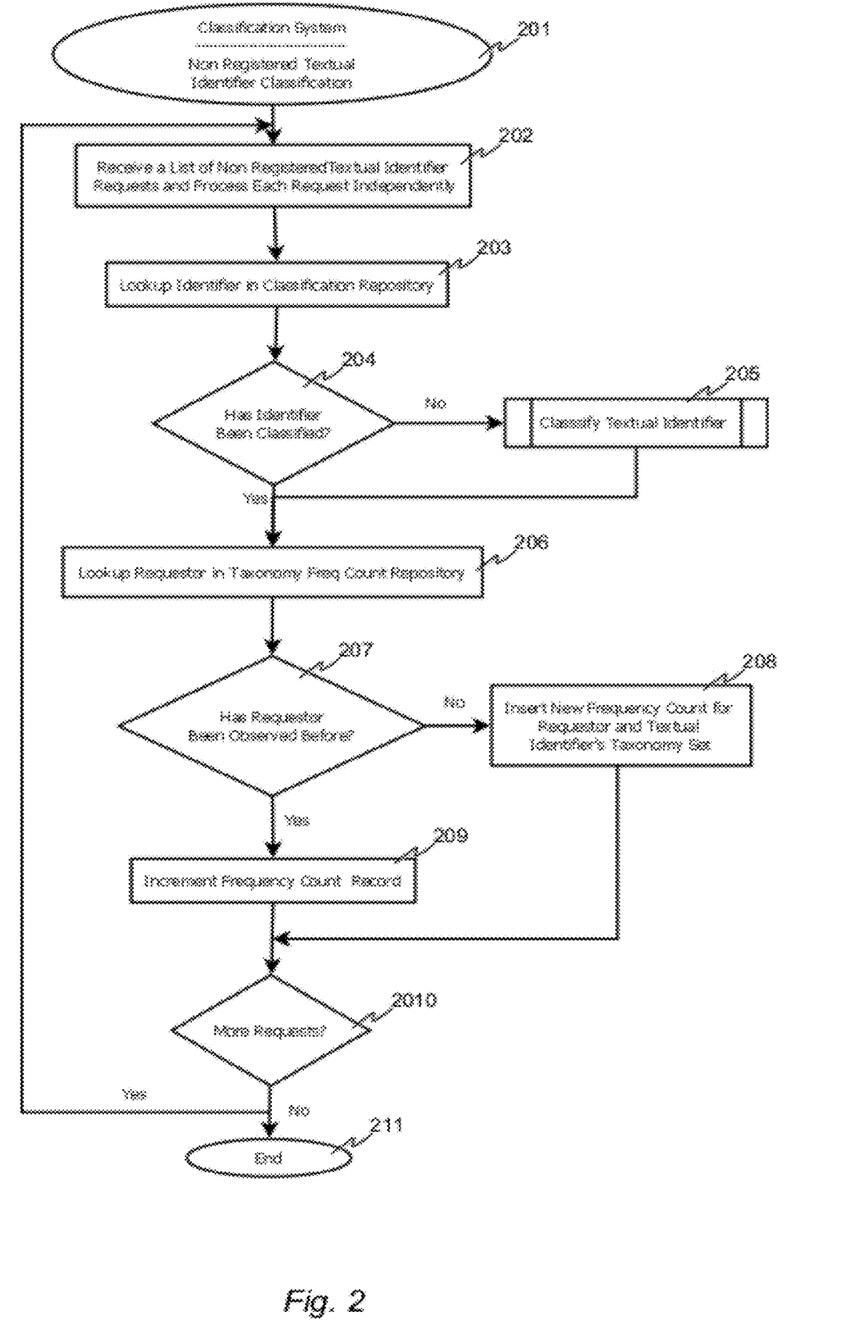
FIG. 2 is a process flow diagram of a Textual Identifier Classification System.

FIG. 2 illustrates an example process flow diagram of a classification system that may be implemented by the classification system 101. The process begins at 201 in which the configuration 102 is loaded and the corresponding repositories for classification rules 105 and registered textual identifiers 103 have been retrieved and loaded into the classification system. The system then retrieves at 202 a list of unresolvable textual identifiers and processes them sequentially through the remaining process flow. The unresolvable textual identifier request retrieved at 202 is checked in an external repository of existing classified textual identifiers 107 at step 203. An inspection of the resulting lookup of step 203 is examined at 204 to determine if the textual identifier has been classified before. If the textual identifier has previously been classified the process continues to 206. Otherwise, the process flow executes a subroutine at 205 to classify the textual identifier.

After the textual identifier has either been classified at 205 or has been determined to be previously classified at 204, the system attempts to retrieve a record in an external repository of requestor-to-taxonomy-set counts 106. The resulting lookup of step 206 is examined at 207 to determine if the requestor has been observed before. If the requestor under consideration at step 207 has been deemed to be observed before, the frequency count for the classified record and its corresponding taxonomical sets are incremented in repository 106. If the requestor has not been observed previously, a new frequency count record for the requestor and the classified textual identifier is inserted into repository 106. The process flow continues at 210 in which an inspection is made to determine if any other records retrieved in step 202 remain. If additional records exist, the process returns to state 202. Otherwise, the process will complete and finish at 211.

Figure 3:
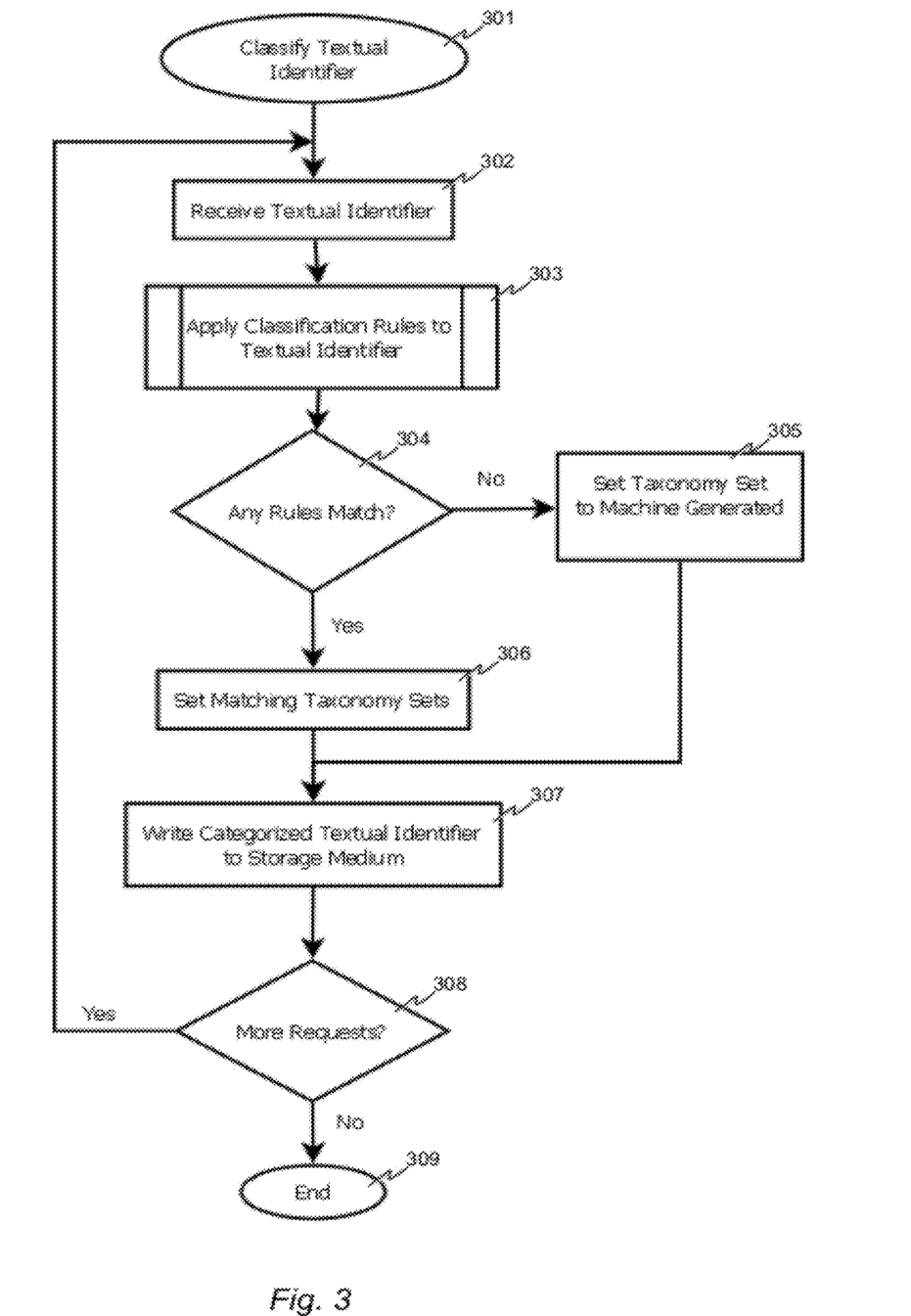
FIG. 3 is a diagram of an embodiment of the Classify Textual Identifier subroutine.

FIG. 3 illustrates further detail of an example method of classifying a domain or other textual identifier as implemented at step 205 in FIG. 2. The method includes receiving an unclassified textual identifier at 302. The subroutine of applying all applicable classification rules is applied to the textual identifier at 303. Thereafter, the classification rules 304 are examined to determine if any of the classification rules matched the textual identifier. If none of the classification rules matched the textual identifier, the textual identifier's taxonomy set is set to "machine generated" at 305. Otherwise, the textual identifier is labeled according to all appropriate matching classification rules at 306. Thereafter, the process continues to write the classified textual identifier to a storage medium such as 107 at step 307. If additional textual identifiers were passed to the classify textual identifier subroutine, the process returns to state 302 or ends at 309 if no other textual identifiers remain to be classified.

As a specific example, the taxonomy used to classify domain name resolution requests may include the categories of "machine generated," and "not machine generated." When a domain name resolution request is received at 302, various classification rules as described elsewhere herein may be applied to determine whether it is believed that the request was generated by a machine. If so, for example if a classification rule matches the request, the request is categorized as "machine generated." Otherwise, it is classified as "not machine generated." Alternatively, requests may be categorized as "machine generated" unless they match one or more classification rules. Other classifications and taxonomy structures may be used.

Figure 4:
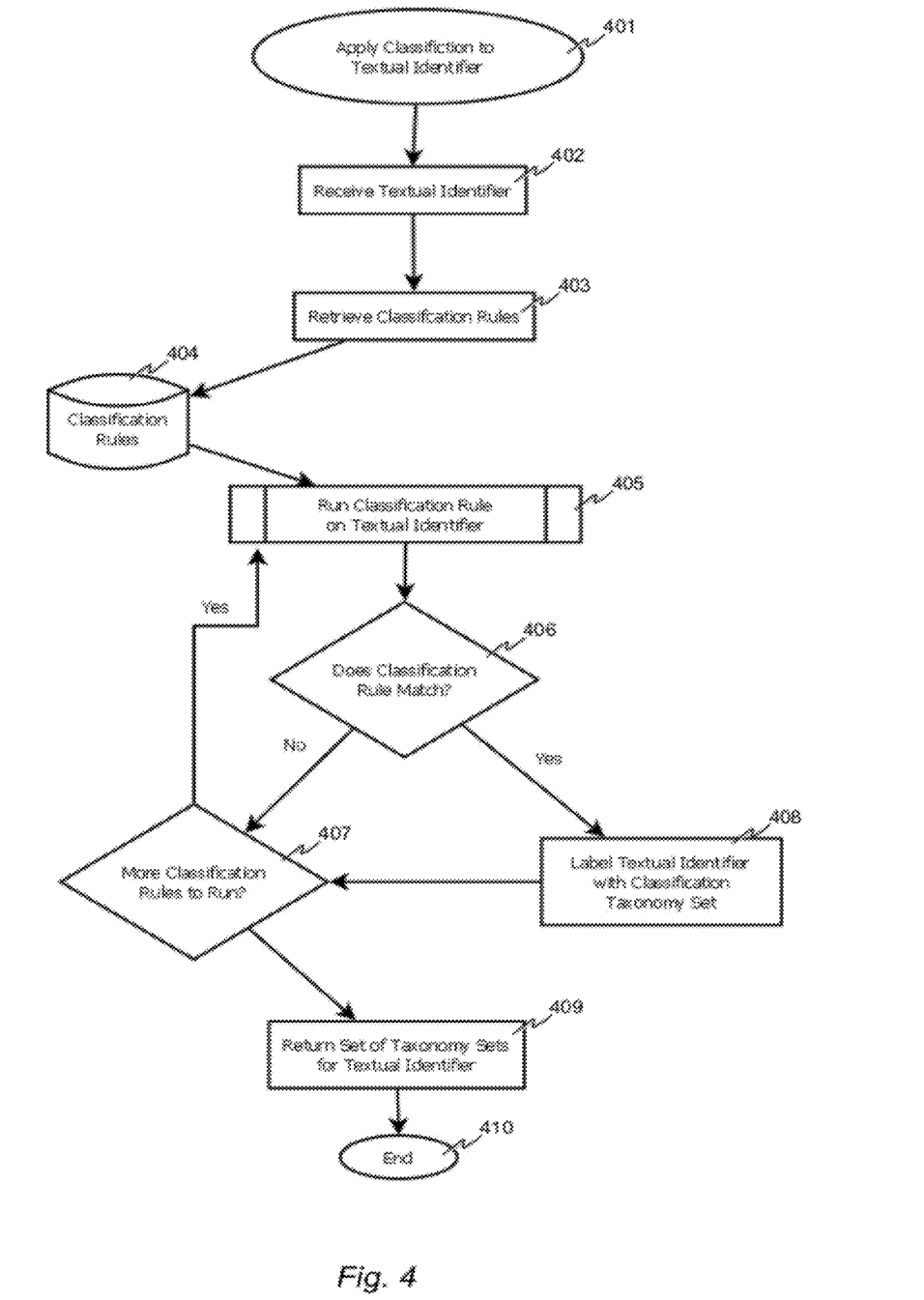
FIG. 4 is a diagram of an embodiment of the Apply Classification to Textual Identifier subroutine.

An example method of applying classification rules to a textual identifier according to step 303 is illustrated in more detail starting at step 401 of FIG. 4. The method includes receiving an unclassified textual identifier 402 and a set of all applicable classification rules are retrieved 403 from the classification rule repository 404. Each classification rule is sequentially processed using the textual identifier as an input. After each classification rule has been applied to a textual identifier, the classification rule output is examined at 406. If the classification rule matched the textual identifier, the textual identifier is labeled with the classification rule's corresponding taxonomical set 408. After applying the label to the textual identifier at 408, or if the classification rule did not match the textual identifier 406, the process continues to 407 to determine whether any additional classification rules remain to be processed against the textual identifier. If additional classification rules remain, the process returns to state 405 or continues to step 409, at which point the subroutine returns a set of taxonomy sets that match the textual identifier and thereafter ends at 410.

Figure 5:
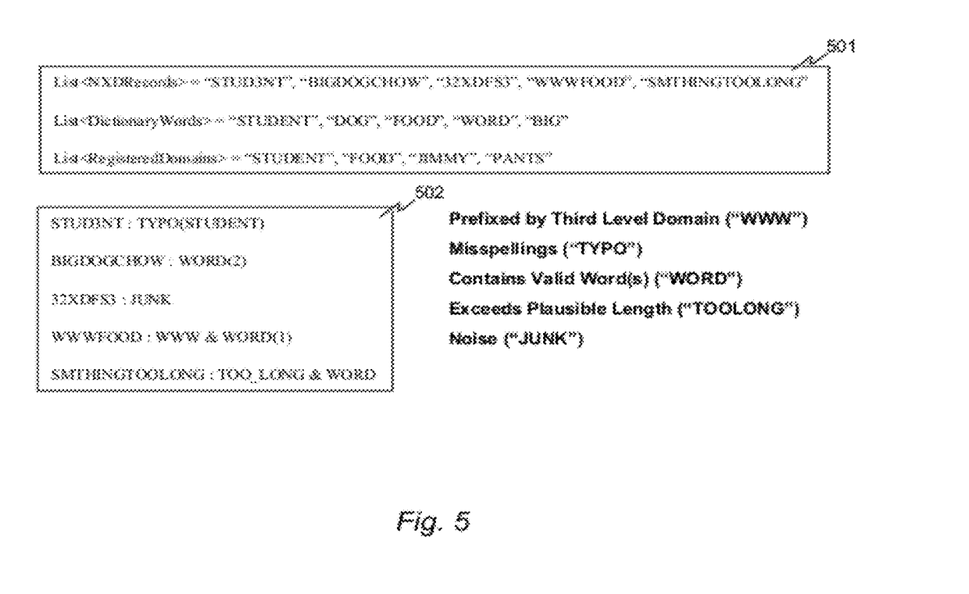
FIG. 5 illustrates an example of classified textual identifiers using a set of exemplary classification rules.

FIG. 5 is an example of applying a simple set of classification rules to a set of textual identifiers. FIG. 5 illustrates three repositories 501 of information: a list of unclassified NXDomain records, a list of dictionary words, and a list of registered domains. For the purpose of simplifying the figure, the top-level domain portion of the domain has been omitted. The relationships 502 illustrate examples of how the list of NXDomain records from 501 may be categorized into a taxonomy based on a set of simple classification rules. These classification rules, although not shown, may include rules such as the detection of typos of an NXDomain to a registered domain within a particular edit distance such as, e.g., a Levenshtein edit distance, the soundex equivalent or distance between a registered domain and an NXDomain, whether the NXDomain is a keyboard equivalent of a registered domain, if the NXDomain record contains a valid dictionary based word, if the domain is prefixed by a common term, or if the domain exceeds a character length limit. Those skilled in the art of classification and taxonomical categorization will appreciate this is a simple and incomplete example of classification rules to be applied to a textual identifier.

Figure 6:
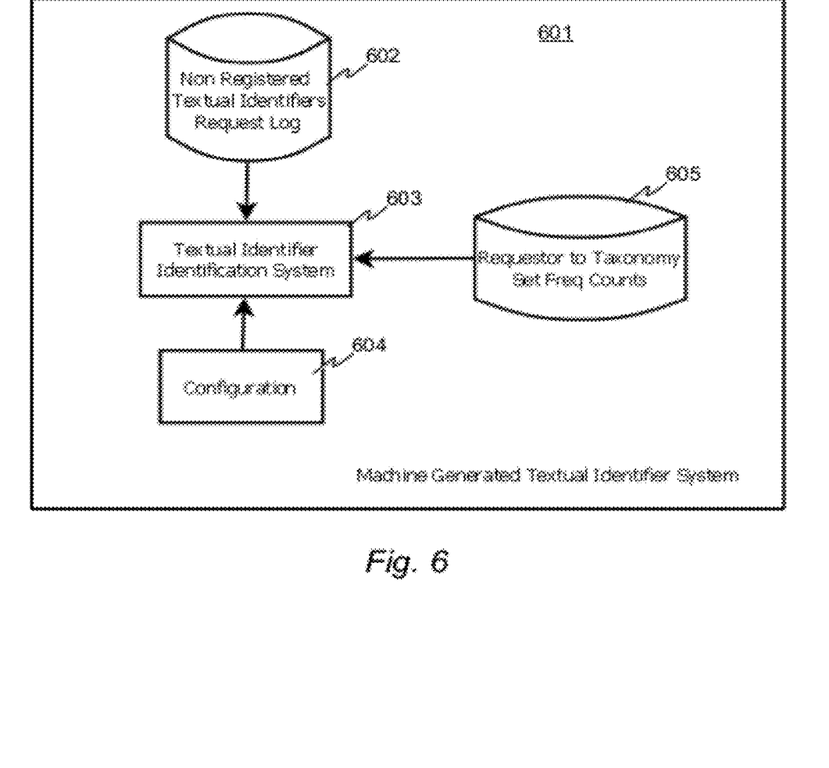
FIG. 6 is a high level component diagram of system components of detecting and scoring textual identifiers as either a machine generated textual identifier or non-machine generated textual identifier.

FIG. 6 is an illustration of a high level component diagram of an example textual identifier classification system. The system 601 includes a configuration component 604 which may include, but is not limited to, a set of properties to define internal classification heuristics to be applied to a textual identifier during the classification process. In the example of classifying textual identifying such as domain names, these configuration settings may include settings such as upper and lower limits for classification of a textual identifier's taxonomical set count to determine if it belongs in a machine generating category or a non-machine generating category. Classification system 601 may use an external repository 602 of non registered textual identifiers requests as an input feed. The classification system 601 also retrieves a set of requestor to taxonomy set frequency counts for a given textual identifier from the external repository 605.

Figure 7:
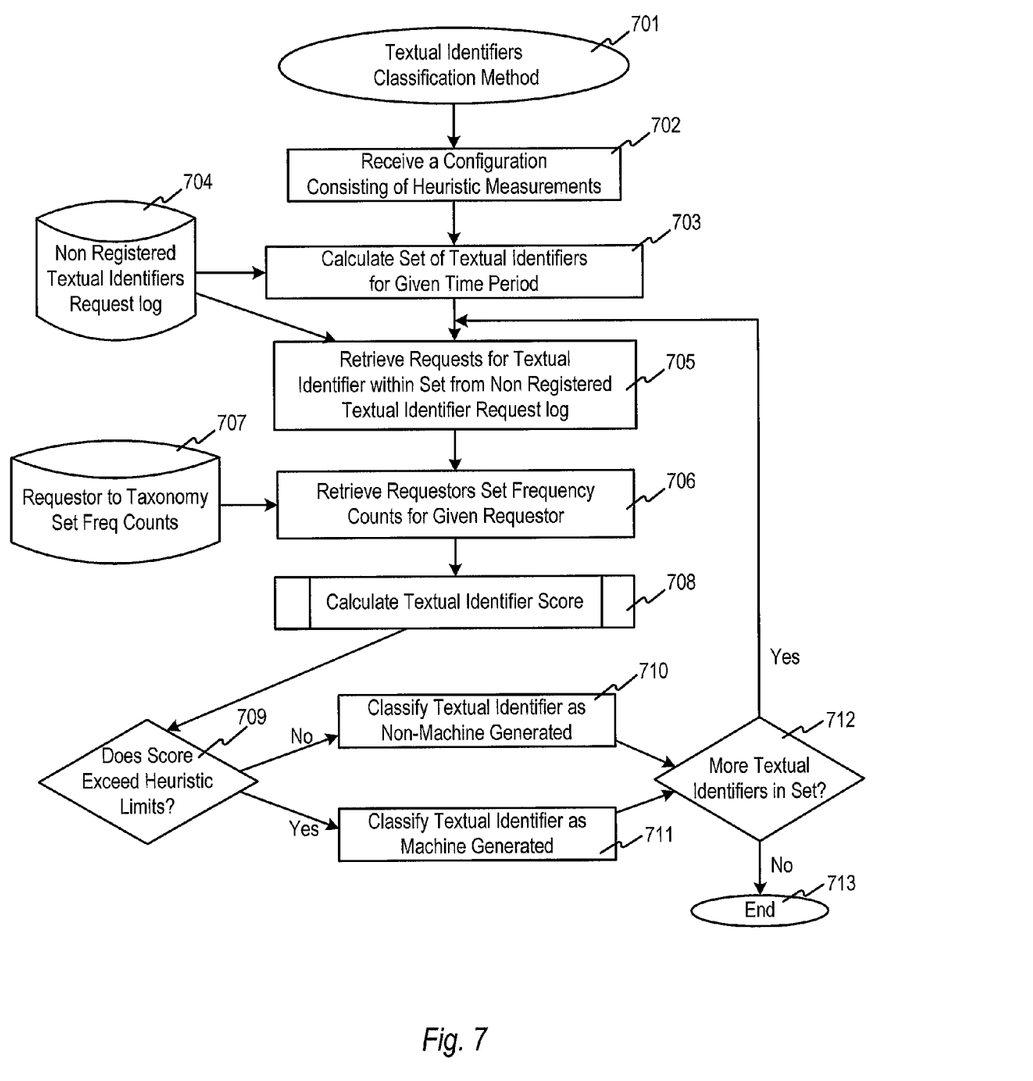
FIG. 7 is a process flow diagram of classifying classified textual identifiers into groups of machine generated or non-machine generated textual identifiers.

FIG. 7 is a process flow diagram of an example textual identifier classification system. The process begins at 701, at which point the classification system has been initialized with a configuration consisting of heuristics measurements used for the classification of a textual identifier 702. Thereafter, the process retrieves a list of textual identifiers for a given time period at 703 from an external repository of non registered textual identifiers 704. Sequentially processing the set of textual identifiers returned from 703, the process retrieves all requests for the textual identifier from the non registered textual identifier request log 704.

For each of the requests retrieved at 704, its corresponding requestor to taxonomy set frequency count is retrieved from the external repository 707 and step 706. The returned sets of data requests are then passed to calculate textual identifier score method in step 708 at which a set of heuristics defined in the configuration object 604 (FIG. 6) is applied. Thereafter, the resulting score of the textual identified is examined at 709 to determine if the value exceeds a configuration 704 threshold. If the value exceeds the threshold, at 711 the textual identifier is classified as a machine generated textual identifier. However, if the textual identifier does not exceed the configuration 704 threshold, the textual identifier is classified as a non-machine generated textual identifier at 710. After the classification steps, an inspection is made to determine if more textual identifiers returned from 703 remain to be classified at 712. If additional textual identifiers remain, the process returns to step 705 or otherwise ends at 713.

Figure 8:
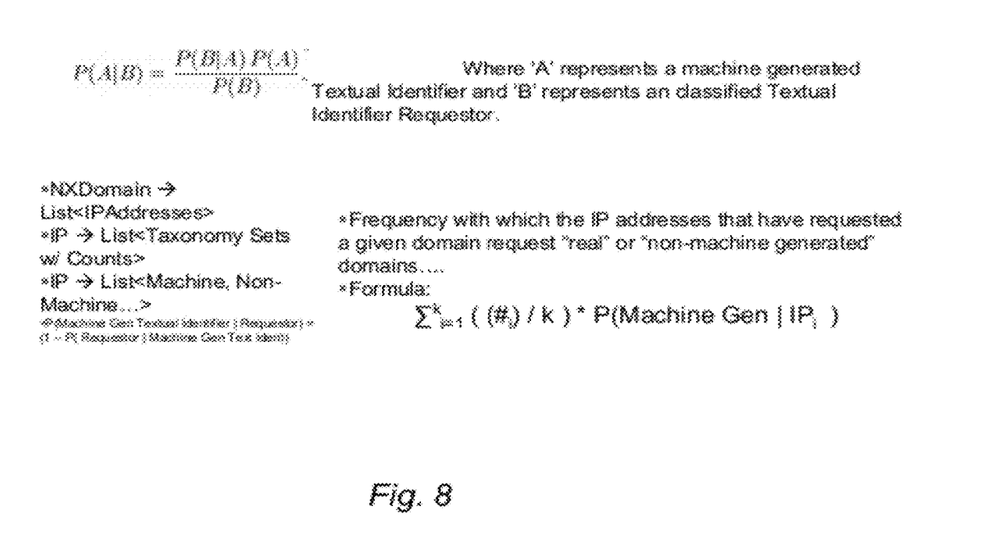
FIG. 8 is an example scoring heuristic used to classify classified textual identifiers.

FIG. 8 is an example of applying a probabilistic measurement to determine if a classified textual identifier is machine generated or non-machine generated. Those skilled in the art of classification will appreciate this approach but will also recognize that other statistical measurements are available to classify textual identifiers. Specifically, this figure depicts an example of Bayesian probability based on the a priori classification of all textual identifiers from a given requestor to determine the probability of a specific textual identifier to be either machine or non-machine generated.

FIG. 9 is an example of raw NXDomain log data collected from authoritative root DNS servers. Each line in the illustrated log represents an unresolved resolution request for an NXDomain including date and time of the request, the IP address of the requestor, i.e., the NXDomain and other data/information specified or permitted by the applicable standard.

NXDomain log data or similar logged data regarding requests for unresolvable textual identifiers may be used to identify a source of machine-generated requests, and/or classify various requestors as being sources of machine generated requests or not. For example, a unique (i.e., excluding duplicates) set of unresolvable domains requested within a given time period may be extracted from the log. Each domain within the set may be classified into predefined taxonomical sets, such as machine generated or not machine generated. A count of the number of requests received for each unresolvable domain within each set may be generated for each of a set of requestors. Finally, a threshold or other heuristic measurement may be applied to determine whether each requestor exhibits a certain level of machine generated traffic. In some cases, the "most requested" NXDomains may be identified. Other metrics in addition to "most requested" also may be used. More generally, various metrics may be used in the present invention to identify various interesting textual identifiers from among a set of candidate textual identifiers, such as those identified as candidates for suggesting to a user or other subset of non-existent, unregistered, or unresolvable identifiers.

Figure 11:
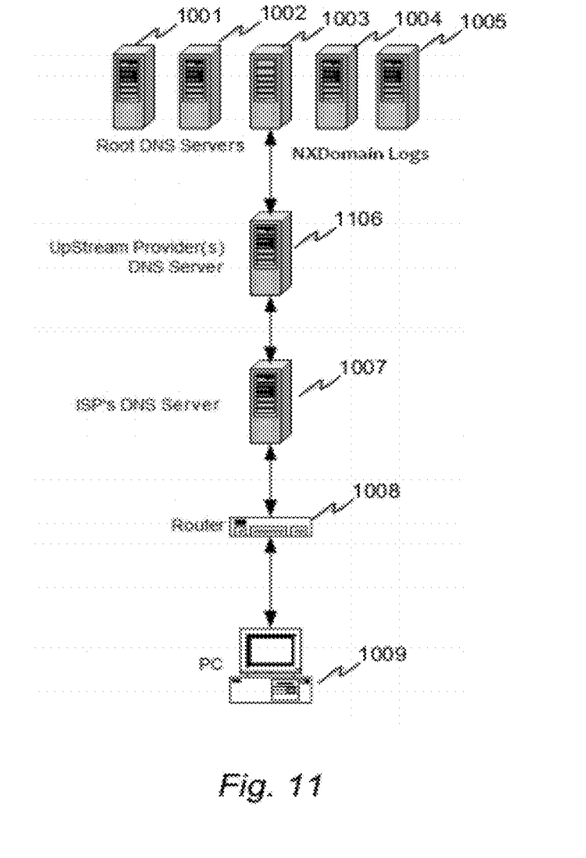
FIG. 11 is a network diagram illustrating interconnected network devices and Domain Name System information.

FIG. 11 is a network diagram illustrating interconnected network devices and Domain Name System information. Root DNS Servers 1001 and 1002 and NXDomain Log Servers 1004 and 1005 interface with server 1003 to service requests from Upstream Provider DNS Server 1006. DNS Server 1006 is accessed by ISP DNS Server 1007 to service requests initiated by, for example, PC 1009 running a suitable client or a malicious Internet bot connecting through Router 1008.

Note that any or all of the devices of the described apparatus for identifying requestors of machine-generated (e.g., Internet bots) requests for resolve a textual identifier and associated hardware may be used in various embodiments of the present invention. However, it can be appreciated that other configurations of the system may include more or fewer devices than those discussed above. The system may alternately be used in any system which would usefully track usage updates, read frequency, etc.

Figure 12:
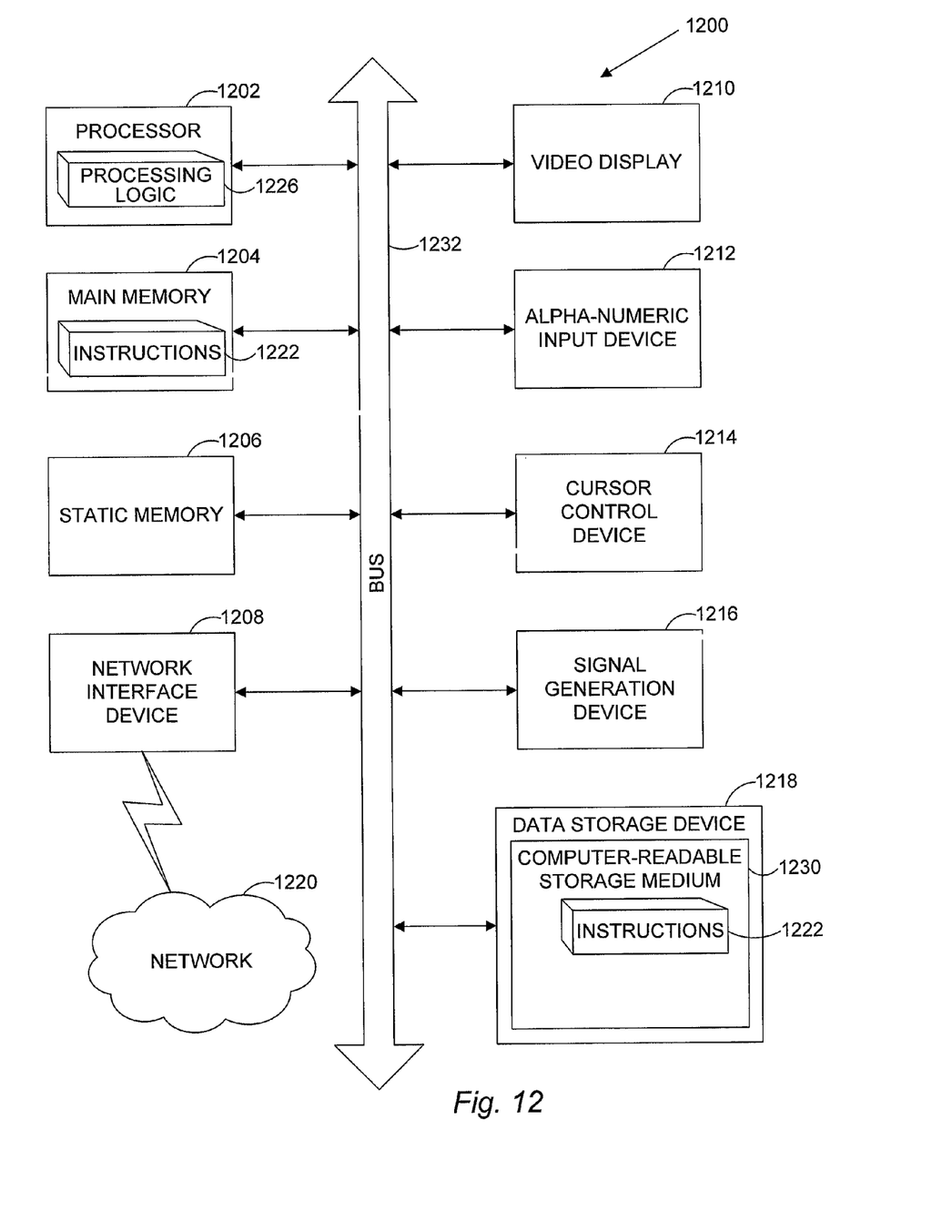
FIG. 12 is an exemplary block diagram of a computer supporting a Textual Identifier Classification System and a Textual Identifier Requestor Scorer system computer in accordance with methods and system consistent with the present invention.

FIG. 12 illustrates a diagrammatic representation of a machine in the exemplary form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage device 1218, which communicate with each other via a bus 1232.

Processing device 1202 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 is configured to execute the processing logic 1226 for performing the operations and steps discussed herein.

The computer system 1200 may further include a network interface device 1208. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker).

The data storage device 1218 may include a machine-accessible storage medium 1230 (also known as a machine-readable storage medium) on which is stored one or more sets of instructions (e.g., software 1222) embodying any one or more of the methodologies or functions described herein. The software 1222 may also reside, completely or at least partially, within the main memory 1204 and/or within the processing device 1202 during execution thereof by the computer system 1200, the main memory 1204 and the processing device 1202 also constituting machine-accessible storage media. The software 1222 may further be transmitted or received over a network 1220 via the network interface device 1208.

While the computer-readable storage medium 1230 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

Thus, some embodiments of methods, apparatus and software for identifying machine-generated requests to resolve a textual identifier have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled. It should further be noted and understood that all publications, patents and patent applications mentioned in this specification are indicative of the level of skill in the art to which the invention pertains. All publications, patents and patent applications are herein incorporated by reference to the same extent as if each individual publication, patent or patent application was specifically and individually indicated to be incorporated by reference in its entirety.

What is claimed is:

1. A computer-implemented method of identifying machine-generated domain resolution requests, the method comprising:

maintaining, in a memory, a log of requests to resolve nonexistent domains;

identifying, using a processor, from among the requests a set of unique nonexistent domains, wherein each domain in the set of unique nonexistent domains comprises a set of characters;

analyzing, using the processor, the set of characters comprising each domain in the set of unique nonexistent domains according to a set of classification rules to assign a taxonomical set classification from a plurality of taxonomical set classifications to each domain, wherein the plurality of taxonomical set classifications comprises machine generated and non-machine generated;

determining, using the processor, a set of requestors that queried each domain in the set of unique nonexistent domains and a number of times that each requestor in the set of requestors queried each domain in the set of unique nonexistent domains;

assigning, using the processor, a requestor-type classification to each requestor in the set of requestors as a machine or a non-machine according to the number of times that each requestor queried nonexistent domains that were assigned the machine generated taxonomical set classification;

calculating a numerical probability score for each unique nonexistent domain based on a combination of the taxonomical set classification and the requestor-type classification;

classifying each unique nonexistent domain as machine generated or non-machine generated based on whether the numerical probability score exceeds a predetermined threshold;

maintaining a count of the number of requests for nonexistent domains within each of the plurality of taxonomical set classifications;

identifying, using the processor, log records of requests made for nonexistent domain names within the machine-generated taxonomical set classification as being the log records of suspicious requests;

creating a set of candidate domains by using the processor to filter out the nonexistent domains corresponding to the log records of suspicious requests;

identifying a set of nonexistent domains having the highest number of requests from the set of candidate domains; and suggesting for registration at least one domain from the set of nonexistent domains.

2. The method of claim 1 wherein the requestors are name servers.

3. The method of claim 1 wherein a unique nonexistent domain with the final classification of machine generated is generated by an Internet bot.

4. The method of claim 3 wherein the Internet bot is selected from a group consisting of a internet agent, a search engine spider, a spider-bot, a robot, virus malware, a crawler, an ant, and an automatic indexer.

5. The method of claim 1 wherein the log of requests comprises an NXDomain data store.

6. The method of claim 1 wherein the plurality of taxonomical sets includes a set of nonexistent domains exhibiting a characteristic of existing registered domains.

7. The method of claim 6 wherein the characteristic of existing registered domains is selected from the set of characteristics consisting of:

(i) a word;
(ii) a prefix string (e.g., "www" and "ftp");
(iii) a character string length less than a threshold number of characters;

(iv) a variation of a registered textual identifier representing a typographical or spelling error;
(v) a soundex equivalent of a registered textual identifier;
(vi) a keyboard-equivalent entry of a registered textual identifier; and
(vii) an edit distance from a registered textual identifier that is less than a threshold value.

8. The method of claim 1 wherein the plurality of taxonomical sets includes a set of nonexistent domains exhibiting a characteristic of nonregistered domains.

9. The method of claim 1 wherein the plurality of taxonomical sets includes a set of nonexistent domains exhibiting a characteristic of non-existent domains (NXDomains).

10. The method of claim 1 wherein the plurality of taxonomical sets is partitioned into (i) Internet bot generated domains and (ii) non-Internet bot generated domains.

11. The method of claim 10 further comprising identifying a threshold amount of Internet bot generated domains relative to non-Internet bot generated domains.

12. The method according to claim 1, further comprising:
identifying a set of nonexistent domains from the set of candidate domains that meet a predefined metric; and
suggesting for registration one or more of the identified domains from the set of nonexistent domains.

13. The method according to claim 1, further comprising weighting non-registered domains within the set of candidate domains based on numbers of requests and assigning registration fees that correspond to the weighting.

\* \* \* \* \*